United States Patent [19]

Marshall

[11] Patent Number: 5,244,575
[45] Date of Patent: Sep. 14, 1993

[54] PROCESS FOR RECOVERING ORGANIC SOLVENTS AND CONTAMINANTS FROM SOAP LIQUORS

[75] Inventor: Gary R. Marshall, Penn Hills Township, Allegheny County, Pa.

[73] Assignee: Westinghouse Electric Corp., Pittsburgh, Pa.

[21] Appl. No.: 753,153

[22] Filed: Aug. 30, 1991

[51] Int. Cl.$^5$ .............................................. B01D 11/04
[52] U.S. Cl. ..................................... 210/634; 134/10; 134/26; 134/40; 210/639; 210/774; 210/787; 210/804
[58] Field of Search ................... 134/10, 25.1, 26, 27, 134/29, 40; 210/634, 639, 693, 787, 805, 806, 909, 638, 774, 804; 436/178; 252/626

[56] References Cited

U.S. PATENT DOCUMENTS

| | | | |
|---|---|---|---|
| 1,955,065 | 4/1934 | Hawley | 210/634 |
| 2,919,246 | 12/1959 | De Boer et al. | 210/634 |
| 4,698,148 | 10/1987 | Keane | 134/26 |
| 4,906,302 | 3/1990 | Bruya | 134/26 |
| 4,975,198 | 12/1990 | Steiner | 210/634 |
| 5,055,196 | 10/1991 | Darian et al. | 134/26 |

OTHER PUBLICATIONS

EPA Laboratory Manual SW-846: Test Methods for Evaluating Solid Waste, vol. 1B, Revision 1, Nov. 1990, pp. 3510A-1 to 3510A-8 and 3520A-1 to 3520A-8.
"EPA Method 505 Automated via Zymate Laboratory Automation System," Environmental Lab Automation Notes, Fall 1990/vol. 1, No. 1, pp. 1 and 7.

*Primary Examiner*—Joseph W. Drodge
*Attorney, Agent, or Firm*—A. C. Addessi

[57] ABSTRACT

A method for recovering contaminants and the organic solvents used to extract the contaminants from an aqueous solution containing soap liquors comprises extracting the aqueous solution with an organic solvent having a density sufficient to extract the contaminants and to subsequently separate the organic solvent from the aqueous solution containing the soap liquors. The method further comprises shaking the aqueous solution for providing intimate contact between the organic solvent and the aqueous solution, adding an inorganic salt after shaking the aqueous solution for separating the aqueous solution into a plurality of layers, reextracting at least one layer with an organic solvent for producing a second plurality of layers, and separating a layer substantially including the organic solvent and the contaminants for recovering the organic solvent and the contaminants from the aqueous solution containing the soap liquors.

29 Claims, 4 Drawing Sheets

PROCESS FOR RECOVERING ORGANIC SOLVENTS AND CONTAMINANTS FROM SOAP LIQUORS

BACKGROUND OF THE INVENTION

1. Field of the Invention

This invention relates to the extraction of organic solvents and contaminants from an aqueous media and, more particularly, to a method for recovering the contaminants and the organic solvents used to extract the contaminants from an aqueous solution including soap liquors.

2. Description of the Prior Art

Contaminated soil is becoming a more common environmental problem. The contaminants can include heavy metals, radioactive species, and organics. Various techniques have been developed to remove specific contaminants. As an example, soap liquors can be added to the contaminated soil to solubilize contaminants which are normally insoluble in water. After solubilizing the contaminants, the solution containing the contaminants, the soap liquors, water, and soil fines is removed from the soil, thereby washing the contaminants from the soil.

An analysis of the aqueous solution removed from the soil can be used for treatability studies and for determining the quantity and type of contaminants removed by the soap liquors from the soil. The analysis, in conjunction with soil analysis, can be used for determining if the desired amount of contaminants has been removed from the contaminated soil. To provide this analysis, the solution must be compatible with the instrumentation used to perform the analysis. As an example, because a gas chromatograph, used to identify and quantify contaminants, is not compatible with soap liquors, the contaminants must be separated from the soap liquors prior to performance of the analysis.

Besides separating the contaminants from the soap liquors for enabling an analysis to be performed, it is also desirable to remove the contaminants from the aqueous solution for reducing the volume of he contaminated material for disposal or further processing of the contaminants.

One procedure for removing the solubilized contaminants from the solution is to extract the contaminants from the aqueous solution with an organic solvent. It is also desirable to recover the organic solvent from the solution including the soap liquors for recycling the organic solvent.

There are several extraction techniques for extracting contaminants and organic solvents from solution. One such technique is a continuous liquid-liquid extraction technique which utilizes a continuous extraction device. However, the extraction time of a typical quantity of solution, such as one liter, using the continuous extractor may be 24 to 48 hours.

Another technique for extracting the contaminants and organic solvents from a solution is the separatory funnel liquid-liquid extraction technique. As described in the EPA laboratory manual SW-846, *Test Methods for Evaluating Solid Waste*, Volume 1B, Revision 1, November 1990, pages 3510A-1 to 3510A-8, a separatory funnel extractor utilizes methylene chloride to extract water insoluble and slightly water soluble organics. However, an emulsion may form, which results in poor recovery of the organic solvents and the contaminants. If the emulsion formation cannot be separated, which occurs when surfactants are present, then the continuous extraction technique is used to extract the solution.

Therefore, what is needed is an improved extraction technique which allows efficient use of a separatory funnel for recovering organic solvents and contaminants from a solution containing a high concentration of surfactants.

SUMMARY OF THE INVENTION

A method for recovering contaminants and organic solvents used to extract the contaminants from an aqueous solution including soap liquors comprises the step of adding an organic solvent with a density sufficient to allow subsequent separation of the organic solvent.

The aqueous solution including the organic solvent is shaken for obtaining an intimate liquid-liquid contact. After shaking, an inorganic salt is added to the aqueous solution for forcing the contaminants and the organic solvents out of the solution, thereby separating the solution into a first top layer, substantially including the inorganic salt and the water, and a first bottom layer, substantially including the soap liquors, the contaminants, and the organic solvent. The first top and bottom layers are separated.

For more complete separation, the first bottom layer is reextracted with additional organic solvent for separating the first bottom layer into a second top layer and a second bottom layer. The second top layer substantially includes the soap liquors and the second bottom layer substantially includes the contaminants and the organic solvent.

After the second bottom layer is separated from the second top layer, the second bottom layer may be placed in an evaporator for evaporating at least a portion of the organic solvent. The second bottom layer may be placed in a centrifuge for removing any remaining soap liquors from the solution containing the contaminants and the organic solvent.

During a separatory funnel extraction, the presence of surfactants, such as soap liquors, cause an emulsion to form after the shaking of the aqueous solution including the organic solvent. The addition of the inorganic salt to the aqueous solution separates the emulsion into a plurality of layers. Due to the separation of the emulsion, the utilization of an organic solvent with an appropriate density for separation of the organic solvent and contaminants from the soap liquors, and the reextraction or retreatment of the aqueous solution, the contaminants and the organic solvents are efficiently recovered from the soap liquors using a separatory funnel technique.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Figure 1:
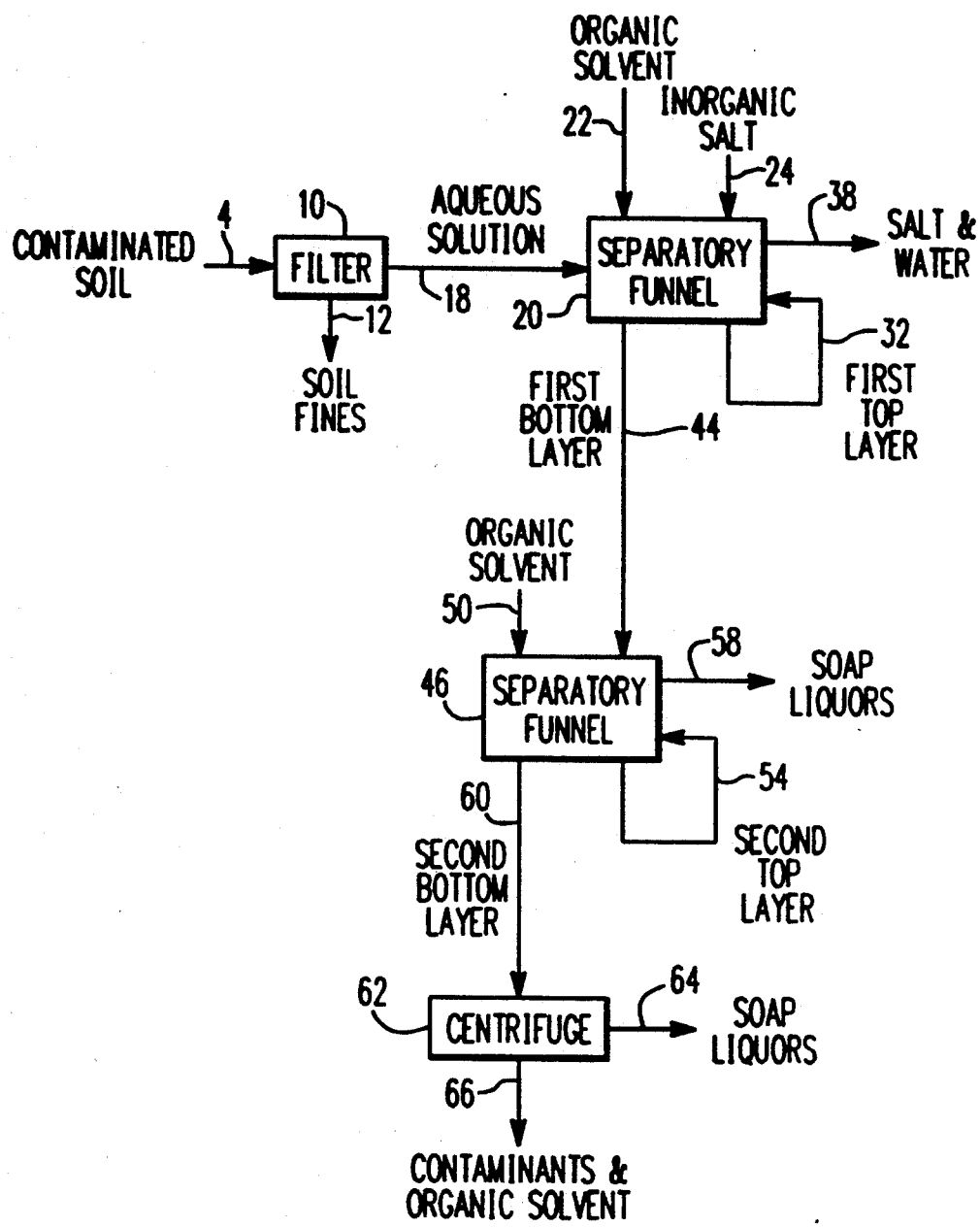
FIG. 1 is a schematic representation of a system for recovering organic solvents and contaminants from an aqueous solution including soap liquors.

The invention described herein provides a method for recovering organic solvents and contaminants from a solution containing high concentrations of soap liquors.

The soap liquors used to wash the soil may include any general soaps and surfactants up to 2% concentration, such as a metal salt of a carboxylic acid. Examples of such soaps are those commercially available as Hyonic NP90 from Witco Corporation and Adsee 799 from Henkel Corporation. The soap liquors may be used to wash soil containing any organic semi-volatile priority contaminants, such as PCBs (polychlorinated biphenyls).

For the various embodiments of this invention, the same reference characters will be used to designate like parts. In addition, like functions and like interactions of parts among the various embodiments of this invention will not be repeated for each embodiments.

Figure 2:
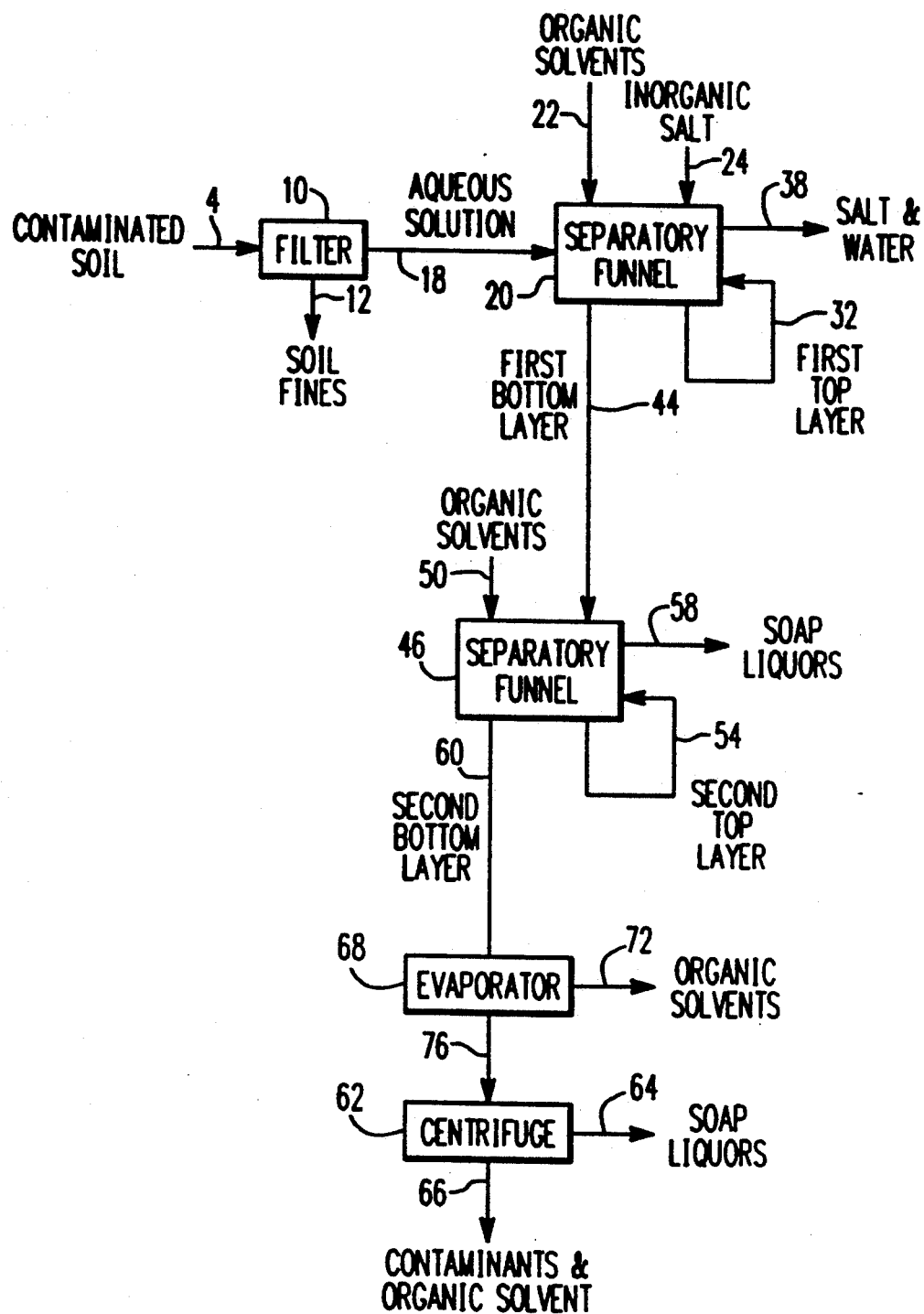
FIG. 2 is an alternative schematic representation of a system for recovering organic solvents and contaminants from an aqueous solution including soap liquors.
Figure 3:
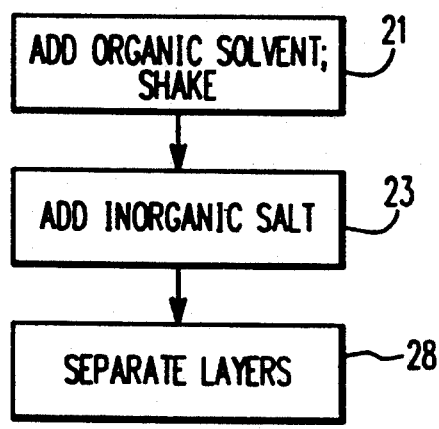
FIG. 3 is a flow diagram of a process for recovering organic solvents and contaminants from an aqueous solution including soap liquors.
Figure 5:
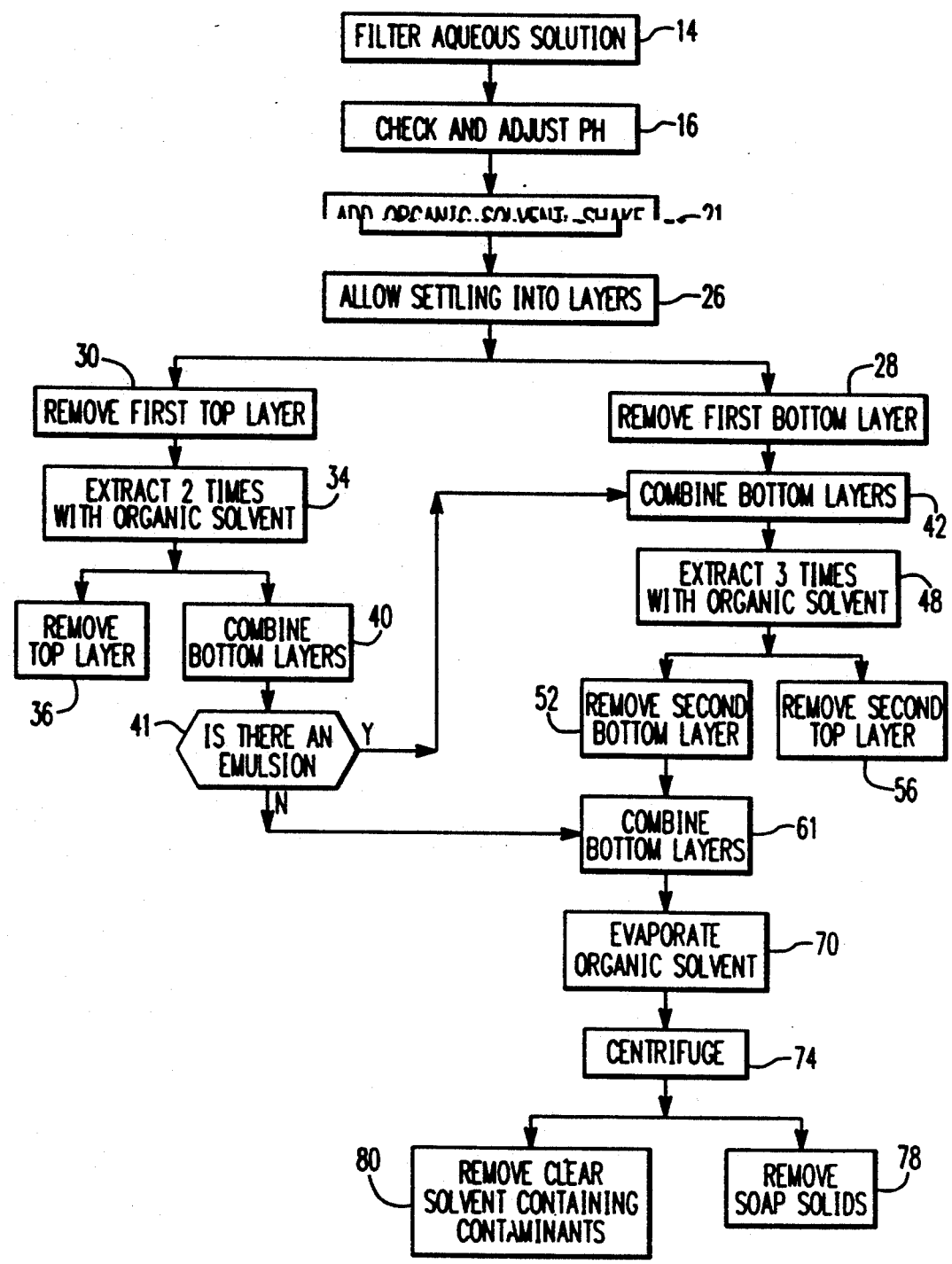
FIG. 5 is yet another more detailed flow diagram of a process for recovering organic solvents and contaminants from an aqueous solution including soap liquors.

Contaminated soil includes contaminants, soap liquors, and water, as results from a soil washing process, such as that described in application Ser. No. 07/529,092 filed May 25, 1990 by Lahoda et al. entitled "Method and Apparatus for Cleaning Contaminated Particulate Material" and assigned to the assignee of the present invention. The contaminated soil is processed in a coarse filtering device (not shown) for substantially removing large solid particles. Referring to FIGS. 1 and 2, to remove soil fines and debris, the contaminated soil is fed through stream 4 into a filter 10 which separates the contaminated soil into solid materials and an aqueous solution. Alternatively, the contaminated soil may be fed into a centrifuge (not shown) for removing the suspended solids from the aqueous solution. The soil fines and debris exit the filter 10 through stream 12. Referring to FIG. 5, box 14 illustrates the step of filtering the aqueous solution to remove soil fines.

The aqueous solution includes the contaminants, the soap liquors, and water. The existence of the soap liquors in the aqueous solution solubilizes the contaminants, which are normally insoluble. Removal of the soap liquors from the solution will desolubilize the contaminants, enabling the contaminants to be removed from the solution.

After removing the soil, the pH of the solution is measured and adjusted, as illustrated by box 16. Depending on the organic contaminant to be extracted, a pH adjustment may not be necessary. The pH may be adjusted by adding HCl or NaOH to the solution to obtain the desired pH value. Preferably, the pH of the aqueous solution is less than two.

Referring to FIGS. 1-5, the aqueous solution is passed through stream 18 into a first separatory funnel 20 for performing an extraction of the contaminants from the aqueous solution. Extraction is a process for dissolving certain constituents of a mixture by means of a liquid with solvent properties for one of the components. The efficiency of the extraction is governed by the partition coefficient of the particular component between the two solvents. A separatory funnel is a funnel having a tap or valve at the bottom end of the funnel and having a stoppered top end. Two immiscible liquids can be dispersed by shaking, and then separated by settling and drawing off the lower liquid.

As an alterative to the use of a separatory funnel, the aqueous solution may be placed in any device suitable for settling an aqueous solution into a plurality of layers. An organic solvent is added, as illustrated by box 21, through stream 22 to the first separatory funnel 20 to produce a mixture of the aqueous solution and the organic solvent. The organic solvent has a density sufficient for subsequent separation of the organic solvent from the aqueous solution containing the soap liquors. Preferably, the organic solvent has a density greater than 1.31678 g/cc at 25° C. for separating the soap liquors from the contaminants. Several examples of such an organic solvent are 1,1,2-trichloro-1,2,2-trifluoroethane, commonly referred to as Freon-113, having a density of 1.56354 at 25° C., 1,1,2,2,-tetrachlorodifluoroethane, commonly referred to as Freon-112, having a density of 1.64470 g/cc at 25° C., and 1,2-dibromotetrafluoroethane, having a density of 2.163 g/cc at 25° C. Also, a mixture of several organic solvents having an appropriate density may be used. After the addition of the organic solvent to the solution, the solution will separate into a top layer containing the contaminants, the soap liquors, and water and into a bottom layer containing the organic solvent.

Figure 4:
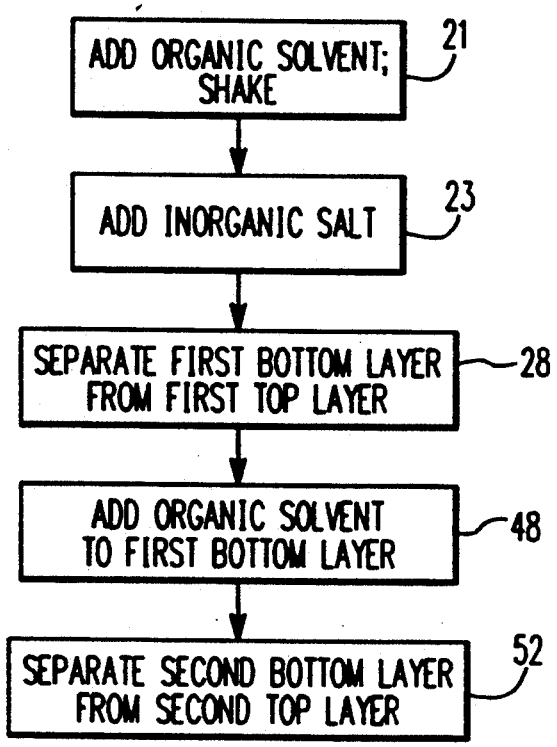
FIG. 4 is a more detailed flow diagram of a process for recovering organic solvents and contaminants from an aqueous solution including soap liquors.

The first separatory funnel 20 is shaken, as illustrated by box 21 of FIGS. 4 and 5, to obtain intimate liquid-liquid contact between the contaminants, the soap liquors, and the organic solvent. The soap liquor, which is a surfactant, causes an emulsion formation or one layer containing the contaminants, the soap liquors, and the organic solvent. Preferably, the first separatory funnel 20 is shaken vigorously for one to two minutes. During the shaking, the first separatory funnel 20 is vented periodically to relieve any excess pressure from within the first separatory funnel 20.

An inorganic salt is added, as illustrated by box 23, through stream 24 to the emulsion formation in the separatory funnel 20 for separating the one layer into a first top layer containing the salt and water and into a first bottom layer containing the contaminants, the soap liquors, and the organic solvent. Various inorganic salts, which do not react with the organic contaminants, may be used, such as sodium chloride and potassium chloride, which are examples of sodium or potassium salts, calcium chloride, and any mixtures thereof. The first separatory funnel 20 may be swirled or tipped gently to dissolve the salt.

The separatory funnel 20 is held in a stationary position for allowing the settling of the contaminants, the soap liquors, and the organic solvent to the first bottom layer, as illustrated by box 26. As an example, the separatory funnel 20 may be held in a stationary position for approximately 20 to 30 minutes. Because salt is extremely soluble in water, the addition of the salt to the solution pushes the organic contaminants and the soap liquors out of the solution, commonly referred to as salting-out, and into the first bottom layer.

Still referring to FIGS. 1-5, the first bottom layer is removed from the first separatory funnel 20, as illustrated by box 28, by opening a valve to drain the first bottom layer from the first separatory funnel 20. Alternatively, if a device is used other than the separatory funnel 20, the bottom layer can be separated from the top layer either by draining the bottom layer or by skimming the top layer from the bottom layer.

The organic solvent solubilizes the contaminants and removes at least a portion of the contaminants from the soap liquors. A portion of the contaminants may remain solubilized by the soap liquors and a portion of the contaminants may be solubilized by the organic solvent.

The first top layer containing the salt and water may also contain a portion of the solubilized contaminants and the soap liquors. The top layer is removed, as illustrated by box 30 of FIG. 3, and may be reextracted to separate the contaminants and soap liquors from the salt and water. Preferably, the first top layer is passed through stream 32 back into the first separatory funnel 20 and is extracted two additional times, as illustrated by box 34, by adding the organic solvent to settle any remaining soap liquors and contaminants to a bottom layer in the separatory funnel 20. The top layer substantially containing the salt and water is removed from the separatory funnel, as illustrated by box 36, and exits the first separatory funnel 20 through stream 38. The bottom layers from the first separatory funnel 20 are combined, as illustrated by box 40.

The bottom layers are examined to determine if an emulsion exists, as illustrated by box 41. If the bottom layers form an emulsion, then the plurality of bottom layers, containing the organic solvent, the contaminants, and the soap liquors, are combined, as illustrated by box 42, and placed through stream 44 into a second separatory funnel 46 for reextracting the first bottom layer. Preferably, the organic solvent with the density of greater than 1.31678 g/cc at 25° C. is added, as illustrated by box 48, through stream 50 to the second separatory funnel 46. After the addition of the organic solvent to the combination of the first bottom layers, the second separatory funnel 46 is shaken and held in a stationary position for separating the solution into a second top layer containing the soap liquors and into a second bottom layer containing the, organic solvent and the contaminants. Periodically, the second separatory funnel 46 is vented to relieve excess pressure from within the second separatory funnel 46.

The second bottom layer containing the organic solvent and the contaminants is removed, as illustrated by box 52, from the second separatory funnel 46 by opening a valve to drain the second bottom layer from the second separatory funnel 46. Alternatively, if a device is used other than the separatory funnel 46, the bottom layer can be separated from the top layer either by draining the bottom layer or by skimming the top layer from the bottom layer.

A portion of the contaminants may remain solubilized by the soap liquors and a portion of the contaminants will be solubilized by the organic solvent. The second top layer containing the soap liquors may also contain a portion of the solubilized contaminants. Preferably, the second top layer is passed through stream 54 back into the second separatory funnel 46 and is extracted two additional times, as illustrated by box 48, with the organic solvent to settle any remaining contaminants to a bottom layer in the second separatory funnel 46. The top layer substantially containing the soap liquors is removed from the second separatory funnel 46, as illustrated by box 56, by exiting the second separatory funnel 46 through stream 58.

The plurality of second bottom layers, which exit from the second separatory funnel 46 through stream 60, are combined with the plurality of first bottom layers, which did not form an emulsion, as illustrated by box 61.

Referring to FIG. 1, the plurality of bottom layers are placed into a centrifuge 62 or filtering device (not shown) for separating any remaining soap solids from the organic solvents and the contaminants. The soap solids are removed from the centrifuge 62 through stream 64 and the contaminants and organic solvents are removed through stream 66. After evaporation of the water, the soap liquors removed through stream 58 can be combined with the soap solids removed through stream 64 for sonication and for recycling of the soap liquors.

Referring to FIGS. 2 and 5, as an alternative to the embodiment illustrated in FIG. 1, the plurality of bottom layers may be placed into an evaporator 68, as illustrated by box 70, prior to placement into the centrifuge 62. Organic solvents, such as Freon-113, are volatile and can be evaporated from the combination of the first and second bottom layers. At least a portion of the organic solvent may be evaporated through stream 72 so that a convenient volume of bottom layers remains for placement into the centrifuge 62. The organic solvents and the contaminants pass from the evaporator 68 to the centrifuge 62, as illustrated by box 74, through stream 76. The evaporated organic solvent may be collected in a device (not shown) for recycling the organic solvent for future reuse. The soap solids are removed from the centrifuge 50, as illustrated by box 78, and the organic solvent and contaminants are removed from the centrifuge 50, as illustrated by box 80, for recovering the contaminants and organic solvent from the aqueous solution containing soap liquors.

The process of extracting the organic solvent and the contaminants may be manual or automated to accommodate laboratory use and full scale plant use.

EXAMPLE 1

The contaminated soil containing high concentrations of soap liquors, such as up to 2%, is filtered to remove the suspended solids from the aqueous solution. After the solids are removed from the aqueous solution, 100 ml of the aqueous solution containing soap liquors is placed into a 250 ml separatory funnel. The pH of the solution is measured. If the pH is above 2, then 0.5 ml of 1:1 HCl is added to the solution and the pH of the solution is remeasured. Additional HCl is added until the pH is 2 or less.

1,1,2-trichloro-1,2,2-trifluoroethane, commonly referred to as Freon-113, having a density of 1.620 g/cc at 0° C. is used as the organic solvent.

After obtaining the desired pH, 6 ml of the Freon-113 is added to the aqueous solution within the 250 ml separatory funnel. The 250 ml separatory funnel is shaken vigorously for approximately one to two minutes. The separatory funnel is vented periodically to relieve excess pressure from within the separatory funnel.

After obtaining intimate contact between the contaminants, the organic solvent, and the soap liquors, 20 g of sodium chloride is added to the 250 ml separatory funnel. The separatory funnel is swirled or tipped gently to dissolve the salt in the aqueous solution. Holding the separatory funnel in a stationary position for approximately 20 to 30 minutes allows the single layer to separate into a first top layer and a first bottom layer.

After the separation of the aqueous solution into layers, the first bottom layer is drained from the 250 ml separatory funnel and placed in a separate sealed container. The first bottom layer substantially includes Freon-113, contaminants, and soap liquors. The first top layer substantially includes inorganic salt and water.

Because a portion of the organic solvent and contaminants may have remained in the first top layer, the top first layer is extracted two additional times in the 250 ml separatory funnel. The additional bottom layers are combined with the first bottom layer in the sealed container.

After combining the plurality of first bottom layers obtained from the plurality of extractions of the first top layer in the 250 ml separatory funnel, the combination of approximately 20 to 25 ml of solution is placed in a 60 ml separatory funnel. The aqueous solution is reextracted by adding 30 ml of Freon-113 to the aqueous solution in the 60 ml separatory funnel and shaking the 60 ml separatory funnel. After the aqueous solution separates into a second top layer and into a second bottom layer, the second bottom layer is drained from the 60 ml separatory funnel and placed in a separate sealed container. The second bottom layer substantially includes Freon-113 and contaminants. The first top layer substantially includes the soap liquors.

Because a portion of the organic solvent and the contaminants may have remained in the second top layer, the second top layer is extracted two additional times in the 60 ml separatory funnel. The additional bottom layers are combined with the second bottom layer in the sealed container.

After combining the plurality of second bottom layers from the 60 ml separatory funnel, the combination is placed in an evaporator. A portion of the Freon-113 is evaporated from the contaminants. After evaporation, the organic solution is placed in a centrifuge for separating any remaining soap solids within the organic solution from the contaminants and the Freon-113 for recovering the organic solvent and the contaminants from the soap solids.

After removing the clear solvent containing the contaminants from the centrifuge, the solution can be analyzed, for example, to identify and quantify the contaminants removed from the soil.

EXAMPLE 2

The contaminated soil washed with soap liquors is filtered to separate the soil fines from the aqueous solution containing the soap liquors and the contaminants. The aqueous solution could be placed in a first separatory funnel and extracted with 1,2-dibromotetrafluoroethane.

After shaking the container vigorously for obtaining intimate contact between the contaminants, the soap liquors, and the organic solvent within the first separatory funnel, an emulsion may form. To separate the emulsion, potassium chloride is added to the first separatory funnel. After holding the first separatory funnel in a stationary position for a period of time sufficient to allow the single layer to separate into a plurality of layers, the layers are separated from one another.

The first bottom layer substantially includes 1,2-dibromotetrafluoroethane, the contaminants, and the soap liquors. The first top layer substantially includes the potassium chloride and the water.

The first bottom layer is placed in a second separatory funnel. The first bottom layer is reextracted by adding 1,2-dibromotetrafluoroethane to the aqueous solution in the second separatory funnel and shaking the second separatory funnel. After the first bottom layer separates into a second top layer and into a second bottom layer, the second bottom layer is removed from the second separatory funnel.

The second bottom layer substantially includes 1,2-dibromotetrafluoroethane and the contaminants. The second top layer substantially includes the soap liquors.

The second bottom layer is placed in a centrifuge for separating any remaining soap solids within the organic solution from the contaminants and the 1,2-dibromotetrafluoroethane for recovering the organic solvent and the contaminants from the soap solids.

Therefore, the invention provides a method for efficiently utilizing a separatory funnel technique for recovering organic solvents and contaminants from an aqueous solution containing high concentrations of soap liquors.

I claim:

1. A method for recovering contaminants from an aqueous solution including soap liquors, comprising the step of, in sequence:
   adding a first quantity of an organic solvent to said aqueous solution for producing a mixture of said soap liquors, said aqueous solution and said organic solvent;
   shaking said mixture for obtaining an intimate contact of said organic solvent and said aqueous solution;
   adding an inorganic salt to said mixture after shaking said mixture for separating said mixture into a plurality of layers; and
   separating and removing one of said plurality of layers substantially including said organic solvent and said contaminants from said mixture and recovering said organic solvent and said contaminants from said soap liquors of said aqueous solution.

2. The method according to claim 1, further comprising the step of adding a second quantity of an organic solvent to at least one of said layers after adding said inorganic salt to said mixture and prior to separating said layer for reextracting said contaminants from said aqueous solution.

3. The method according to claim 2, wherein at least the step of adding said first quantity of organic solvent comprises adding an organic solvent having a density sufficient to allow subsequent separation of the at least first quantity of organic solvent from an aqueous solution containing soap liquors.

4. The method according to claim 2, further comprising the step of adding a third quantity of an organic solvent to at least one of said plurality of layers for settling any of said contaminants remaining in a top layer into a bottom layer, said bottom layer substantially including said contaminants and said organic solvent quantities.

5. The method according to claim 1, further comprising the step of filtering suspended solids from said aqueous solution prior to adding said first quantity of said organic solvent to said aqueous solution for removing said suspended solids from said aqueous solution.

6. The method according to claim 1, wherein the step of separating, removing and recovering comprises centrifuging said layer substantially including said contaminants and said organic solvent for removing said soap liquors from said layer and for recovering said organic solvent and said contaminants from said soap liquors.

7. The method according to claim 1, wherein the step of separating one of said plurality of layers comprises evaporating at least a portion of said organic solvent for removing said organic solvent portion from said contaminants.

8. The method according to claim 1, wherein said aqueous solution, prior to addition of the organic solvent, contains contaminants, soap liquors that have solubilized the contaminants, and water.

9. The method according to claim 8 wherein said aqueous solution is derived from a soil washing process.

10. A method for recovering contaminants from an aqueous solution containing soap liquors, comprising the step of, in sequence:
 adding a first quantity of an organic solvent to said aqueous solution to produce a mixture of said soap liquors, said aqueous solution and said organic solvent;
 shaking said mixture for providing intimate contact between said organic solvent and said aqueous solution;
 adding an inorganic salt after shaking said aqueous solution including said organic solvent for separating said mixture into a first top layer and a first bottom layer;
 removing at least one of said first bottom layer and said first top layer;
 adding a second quantity of an organic solvent to said first bottom layer for producing a second top layer and a second bottom layer; and
 separating said second bottom layer from said second top layer for recovering said contaminants from said aqueous solution.

11. The method according to claim 10, wherein said step of separating said second bottom layer further comprises recovering said organic solvent quantities from said aqueous solution.

12. The method according to claim 9, wherein the step of separating said second bottom layer comprises centrifuging said second bottom layer for removing said soap liquors and for recovering said organic solvent quantities and said contaminants from said aqueous solution.

13. The method according to claim 9, wherein the step of separating said second bottom layer comprises evaporating at least a portion of said organic solvent quantities for removing said organic solvent portion from said contaminants.

14. The method according to claim 10, wherein at least said first quantity of organic solvent has a density sufficient for extracting said contaminants and said at least first quantity of organic solvent from said aqueous solution containing soap liquors.

15. The method according to claim 10, further comprising the step of filtering suspended solids from said aqueous solution prior to adding said first quantity of said organic solvent to said aqueous solution for removing said suspended solids from said aqueous solution.

16. The method according to claim 10, wherein after said inorganic salt is dissolved in said mixture, said mixture is held in a stationary position for allowing said aqueous solution to separate into said first top layer and said first bottom layer.

17. The method according to claim 10, further comprising the step of adjusting the pH of said aqueous solution prior to adding said first quantity of said organic solvent so that said pH is 2 or less.

18. The method according to claim 10, further comprising extracting said first top layer prior to adding said second quantity of said organic solvent to said first bottom layer for settling said contaminants and said organic solvent quantities are in said top layer into a bottom layer.

19. The method according to claim 10, further comprising, after adding said second quantity of said organic solvent to said first bottom layer, extracting said second top layer for settling said contaminants and said organic solvent quantities in said top layer into a bottom layer.

20. The method according to claim 10, wherein said organic solvent quantities are selected from the group consisting of 1,1,2-trichloro-1,2,2-trifluoroethane; 1,1,2,2-tetrachloro-difluoroethane; 1,2-dibromotetrafluoroethane; and mixtures thereof.

21. The method according to claim 10, wherein said inorganic salt does not react with said contaminants.

22. A method for recovering contaminants from an aqueous solution including soap liquors, comprising the steps of:
 placing at least a portion of said aqueous solution in a first separatory funnel;
 extracting said contaminants from said aqueous solution at least once by adding a first quantity of an organic solvent to said aqueous solution;
 shaking said first separatory funnel after adding said organic solvent for providing intimate contact between said organic solvent, said contaminants, and said soap liquors;
 adding an inorganic salt after shaking said first separatory funnel for separating said aqueous solution into a first top layer, which substantially includes water and said inorganic salt, and a first bottom layer which substantially includes said organic solvent, said contaminants, and said soap liquors;
 separating said first bottom layer from said first top layer in said first separatory funnel;
 placing said first bottom layer into a second separatory funnel;
 reextracting said contaminants from said first bottom layer at least once by adding a second quantity of an organic solvent to said first bottom layer for producing a second top layer, which substantially includes said soap liquors, and a second bottom layer, which substantially includes said organic solvent and said contaminants; and
 separating said second bottom layer from said second top layer for recovering said contaminants and said organic solvents from said aqueous solution containing soap liquors.

23. The method according to claim 22, wherein at least said first quantity of organic solvent has a density sufficient for separating said contaminants and said at least first quantity of organic solvent from said soap liquors.

24. The method according to claim 22, further comprising the step of filtering suspended solids from said aqueous solution prior to placing said aqueous solution in said first separatory funnel for removing said suspended solids from said aqueous solution.

25. The method according to claim 22, further comprising the step of evaporating at least a portion of said organic solvent quantities from said second bottom layer for removing said portion from said contaminants.

26. The method according to claim 22, further comprising the step of adjusting the pH of said aqueous solution so that said pH is 2 or less.

27. The method according to claim 22, wherein said organic solvent quantities are selected from the group consisting of 1,1,2-trichloro-1,2,2-trifluoroethane; 1,1,2,2-tetrachloro-difluorethane; 1,2-dibromotetrafluoroethane; and mixtures thereof.

28. The method according to claim 22, wherein said inorganic salt is selected from the group consisting of sodium chloride, potassium chloride, calcium chloride, and mixtures thereof.

29. The method according to claim 20, wherein the step of separating said second bottom layer comprises centrifuging said second bottom layer for removing said soap liquors and recovering said organic solvents and said contaminants from said aqueous solution.

* * * * *